United States Patent Office

3,652,507
Patented Mar. 28, 1972

3,652,507
CATALYTIC CONDENSATION OF CYCLIC NITRILE CARBONATES
Emmett H. Burk, Jr., Glenwood, Ill., Helmuth W. Kutta, Buffalo, N.Y., and Larry G. Wolgemuth, Hickory Hills, Ill., assignors to Atlantic Richfield Company, New York, N.Y.
No Drawing. Filed Dec. 3, 1968, Ser. No. 780,878
The portion of the term of the patent subsequent to Sept. 29, 1987, has been disclaimed
Int. Cl. C08g 22/00, 22/04, 22/34
U.S. Cl. 260—77.5 AB          33 Claims

ABSTRACT OF THE DISCLOSURE

An improved method of preparing an organic compound having one or more urea, urethane or thiourethane groups by condensing nucleophilic compounds having one or more primary amino, secondary amino, hydroxyl or mercapto radicals with cyclic nitrile carbonates of the formula:

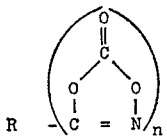

wherein R is an organic radical which is free of reactive hydrogen atoms and $n$ is 1 to 4. The method involves catalyzing the condensation reaction with the catalyst combination of:

(I) a first metal selected from the metals of Groups III through V of the Periodic Chart, e.g., tin, and (II) a second metal selected from the metals of Groups I and II and the iron series of Group VIII of the Periodic Chart, e.g., and alkali metal. Thus, for example, polyurethanes with weight average molecular weights of from about 150,000, or even about 300,000, to 1 million or more can be prepared by condensing a poly(tetramethylene ether) glycol with butane-1,4-di(nitrile carbonate) using a catalyst combination of tin (supplied as dibutyl tin dilaurate) and sodium (supplied as sodium t-butoxide).

---

This invention relates to an improved method of preparing organic compounds such as polyurethanes by the condensation of reactive hydrogen-containing compounds with cyclic nitrile carbonates and to novel, high molecular weight polyurethanes which can be produced thereby. More particularly, the invention relates to the use of a catalyst combination of a first metal selected from Groups III, IV, and V and a second metal selected from Groups I, II and the iron series of Group VIII of the Periodic Chart of the elements to catalyze the condensation reaction.

Heretofore, it has been common practice to prepare ureas, urethanes, and thiourethanes by the reaction of an isocyanate and the appropriate, reactive hydrogen-containing material. Although use of the isocyanates for the preparation of ureas, urethanes, and thiourethanes is quite popular and extensively employed, it is not without criticism. First of all, the isocyanates are unstable and present storage and handling difficulties. Secondly, many isocyanates are highly toxic, especially the aliphatic isocyanates. Thirdly the reactivity of the —NCO group precludes premixing of the isocyanate with the reactive hydrogen-containing material to form a single component system without first blocking the terminal isocyanate groups, and blocked isocyanate materials have the disadvantage of requiring high curing temperatures to liberate the blocking group and reactivate the —NCO group. Fourthly, in the production of foamed polyurethanes and polyureas via the isocyanate route it is necessary to go through the expense and inconvenience of adding a separate foaming agent or of using an excess of isocyanate and water to gain the required gas release.

The aforementioned disadvantages are not present in the process of preparing such organic compounds by condensing a reactive hydrogen-containing organic compound with, instead of an isocyanate, a compound having the structure:

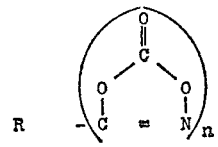

wherein R is an organic radical which is free of reactive hydrogen atoms and $n$ is 1 to 4. For convenience, the compounds identified by the above structural formula will be herein referred to as "cyclic nitrile carbonates." It has now been found that this process will be generally improved as regards, for example, reaction rate, selectivity to desired product, and ability to operate at lower reaction temperatures, if the reaction is catalyzed by contatcing the reactants with catalytically-effective amounts of the combination of:

(I) a first metal or a mixture of metals selected from the metals of Groups III through V of the Periodic Chart of the elements, and (II) a second metal or a mixture of metals selected from the metals of Groups I and II and the iron series of Group VIII of the Periodic Chart.

The two metals are supplied to the catalyst combination as one or more compounds which are sufficiently soluble in the reaction mixture to allow for the metals to be dissolved in the reaction mixture in catalytically-effective amounts. Thus, the metals are not suitably employed in their insoluble elemental state in the catalyst combination. Preferably, there will be present in the catalyst combination about 0.2 to 4 molar equivalents of the first metal, i.e. the Groups III–V metal, per molar equivalent of the second metal, i.e. the Groups I, II or iron series metal.

In accordance with one embodiment of the present invention, to be hereinafter discussed more fully, wherein the two metals are supplied in the form of a bimetallic alkoxo salt, the metals are preferably employed in the catalyst combination in an approximately stoichiometric ratio, e.g. in the ratio required for as nearly quantitative formation of the alkoxo salt—neither metal being present in material excess—as can practicably be attained. Such a ratio is especially suitable for the preparation of the higher molecular weight polymers, e.g. polyurethanes, according to the process of the present invention. Often times there will be present in the reaction mixture one or more ingredients with which one of the metal components will preferentially react rather than form the alkoxo salt. Polyglycols, for instance, often contain a small amount of carboxyl functionality which will tie up alkali metals, e.g. sodium, preventing the metals from entering into, or remaining in, their alkoxo salt form. The amount of alkali metal required to neutralize the carboxyl functionality in such a system is not considered herein to be "excess" over stoichiometric, as that term is used in the foregoing discussion. Rather, the preferred, "approximately stoichiometric ratio" in such a system is that ratio which provides that for all of the alkali metal present in the reaction mixture over and above that consumed in salifying the carboxyl groups there is present in the mixture approximately the exact amount of the Groups III through V metal, and materially no more nor less, as is required to form the alkoxo salt. As mentioned above, this is the preferred condition when it is desired to obtain the highest molecular weight polymers possible. Where, however, the stoichiometric ratio cannot be accurately ascertained, as may frequently be the case, due, for example, to the presence of unknown amounts of interfering impurities, then it is preferable to employ an excess of the Groups III through V metal rather than an excess of the Groups I and II or iron series metal. This is especially true where the latter metal is an alkali or alkaline earth metal and is supplied to the system in its oxide, hydroxide, or alcoholate form, since it has been found that the presence of such free base should be minimized if the object of the reaction is to obtain high molecular weight products.

Where either, or both, of the metals employed in the catalyst composition are metals which exhibit variable positive valences, as, for example, titanium, tin, copper, and bismuth, it is generally preferred that they be present in the catalyst combination in their highest positive valence state. Thus, for example, it is preferred to employ a tetravalent titanium component rather than di- or trivalent titanium components.

The two metals may be supplied as entirely separate and distinct compounds, but preferably are supplied as a bimetallic compound, e.g., a salt, a complex, etc. Such compounds may exist separately from the reactants in the condensation reaction mixture or may be formed in situ in the mixture by chemical combination of one or both of the metals with one or more of the condensation reactants. Thus, for example, it is often preferred in the improved method of the present invention—especially where high molecular weight polymers are desired—to solubilize the catalytic metals by forming what are termed as "alkoxo salts," which are bi-metallic coordination compounds prepared by combining an alcoholate, e.g. an alkoxide, of the Groups III–V metal with an alcoholate of the Groups I, II or iron series metal. (Such compounds and their preparation are discussed, for example, in the article by Meerwein et al., "Investigations Concerning Metal Alcoholates and Ortho Acid Esters. I. Alkoxo Acids and Their Salts," Annalen der Chemie, vol. 476, pages 113 to 150 (1929), herein incorporated by reference.) The hydroxyl-containing compound required for formation of the alkoxo salt can be supplied, for instance, by a hydroxyl-containing nucleophilic reactant to be employed in the condensation reaction. In preparing polyurethanes from a poly(nitrile carbonate) and a poly(alkylene ether) glycol, for example, the latter reactant can supply the alcoholate portion of the alkoxo salt catalyst. The alkoxo salt could thus be prepared by initially employing the glycol reactant or, if the salt-forming reaction proceeds too slowly, the alkoxo salt can be preliminarily prepared using a faster reacting, monohydric alkanol, such as butanol, and the alkoxy group obtained therefrom subsequently replaced in an alkoxyl-interchange reaction with the glycol reactant. If desired, the regenerated alkanol from the alkoxyl-interchange reaction can then be evaporated from the reaction mixture prior to addition of the poly(nitrile carbonate).

As indicated above, it is often preferred to employ as the catalyst combination a bi-metallic compound of the two catalytic metals. Most preferred among these bi-metallic compounds are salts of the general formula:

$$Mc^+(MaX)^-$$

wherein Ma is the Groups III–V metal, Mc is the Groups I, II or iron series metal, and X is a component which is capable of entering into an interchange reaction with the nucleophilic compound to be employed in the condensation reaction to effect salt formation and production of any of the following linkages between the Groups III–V metal and the nucleophilic compound:

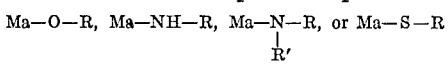

Thus, X can be, for example, hydrogen, hydroxyl, oxy, hydrocarbyl (such as alkyl), hydrocarbyloxy (such as aliphatic hydrocarbyloxy, preferably alkoxy), hydrocarbylcarbonyloxy (such as acetyl), halo, acetylacetonyl, cyano, nitrate, etc., provided the bi-metallic compound has some solubility in the reaction mixture. With some Groups III–V metals the sole presence of oxy groups as the X compound—as, for example, in the case of aluminum—may render the bimetallic compound too insoluble, whereas their sole presence in association with other Groups III–V metals—as, for example, in the case of tin—will not prevent the formation of a soluble bi-metallic compound.

Preferred hydrocarbyl, hydrocarbyloxy, and hydrocarbylcarbonyloxy radicals are those having 1 to about 50, most preferably 1 to about 20, carbon atoms, and the hydrocarbyl moieties thereof can be aliphatic (including cycloaliphatic), aromatic or mixed aliphatic-aromatic, e.g., alkyl, aryl, alkaryl, or aralkyl. The halo radicals can generally have an atomic number of 9 to 53. Chloro is preferred.

Preferred bi-metallic compounds are those wherein X in the above formula is at least partially supplied by —OR groups. Thus, the preferred bi-metallic compounds include the alkoxo salts mentioned above, as well as hydroxo salts, and can be represented by the formula:

$$Mc^+\{Ma(OR_n)\}^-$$

wherein R is alkyl, aryl, mixed alkyl-aryl, polyether, polyester, or hydrogen, and $n$ is at least one and may be as high as 5, depending on the valence of Ma. All but one valence of Ma may be satisfied by groups other than —OR provided they are non-deleterious towards the salt formation and the condensation reaction. Where R in the OR moiety is hydrogen, as, for example, in the case of $$Na^+\{Al(OH)_4\}^-$$

the —OH group apparently is converted to —OR, —SR, —NHR, or —NR'R during the condensation reaction, with the replacing moiety being supplied by the nucleophilic reactant.

It is to be understood that Mc and Ma in the above generic formulae can be supplied by more than one atom of their respective metals and that where a plurality of such atoms are present in the compound they can be bonded to each other as well, for example via an oxygen linkage. Thus, for instance, in the case where Ma is tin and Mc is sodium, the moiety MaX⁻ can be a tetraalkyldistannoxane moiety to yield a salt of the formula:

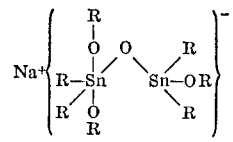

Preferably, the bi-metallic compound Mc⁺(MaX)⁻ is non-dissociated in ethyl alcohol and is essentially unreactive with methyl iodide, i.e., is an essentially neutral compound. The closer the bi-metallic compound approaches the foregoing two characteristics, the more selective is the catalyst for the preparation of high molecular weight polymers. Preferred among these neutral compounds are the alkoxo salts, mentioned above. These non-dissociatable compounds, when employed as the catalyst combination in the improved method of the present invention to produce polyurethanes from diols and di(nitrile carbonates), have been found to often provide more linear, more soluble, and higher molecular weight polymers than are obtained via the conventional preparation of such polyurethanes from diols and diisocyanates.

The R radical in the formula for the cyclic nitrile carbonate represents a monomeric or polymeric organic structure which is free of nucleophilic groups containing reactive hydrogen atoms. The presence of other, non-interfering groups such as alkoxy, nitro and halo, either as part of a main chain in R or in side chains, is not excluded. Nucleophilic groups which have a reactive hydrogen may be identified as those that give a positive Zerewitinoff test, that is, which, when contacted with a Grignard solution of methyl iodide, effect the liberation of methane by decomposition of the Grignard reagent. R, then, may be said to consist essentially of carbon and hydrogen, thus recognizing that while elements other than carbon and hydrogen can be present, either in pendant groups or in a main chain, they must not change the characteristic intended for R, that is, that it be free of nucleophilic groups containing reactive hydrogen atoms. The radical R contains at least 1 and up to about 5,000 or more carbon atoms so as to give cyclic nitrile carbonates having molecular weights of up to about 75,000 or more.

Monomeric cyclic nitrile carbonates can be prepared by reaction of the corresponding hydroxamic acids with phosgene. In these monomeric compounds the R radical often has 1 to about 30 or to about 50 carbon atoms or more, preferably up to about 12 carbon atoms, which radicals may be aliphatic, aromatic or mixed aromatic-aliphatic groups, e.g. alkyl, aryl, mono-alkenyl, alkaryl, dialkenyl, aralkyl, etc. Where the radicals contain ethylenic unsaturation, the ethylenic bond will preferably not be present in the alpha position to the carbonate group.

Polymeric cyclic nitrile carbonates can be prepared, for instance, by copolymerization of addition polymerizable, ethylenically unsaturated cyclic nitrile carbonate monomers with dissimilar, polymerizable, ethylenically unsaturated monomers, for example as disclosed in U.S. Pat. No. 3,480,595, patented Nov. 25, 1969, and incorporated herein by reference. Alternatively, they can be prepared as so-called prepolymers by the reaction of monomeric cyclic nitrile carbonates and polymeric nucleophilic compounds as discussed below and in our copending application Ser. No. 592,288, filed Nov. 7, 1966, likewise incorporated herein by reference. Illustrative of polymeric R radicals are radicals derived from polymerized vinyl hydrocarbons, polyesters, polyethers, etc., including polymeric radicals containing as side chains one or more cyclic nitrile carbonate groups, i.e.

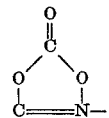

The reaction of hydroxamic acids with phosgene to produce cyclic nitrile carbonate reactants for use in the present invention has been described in copending applications Ser. No. 651,380, filed July 6, 1967 and now abandoned; Ser. No. 671,932, filed Oct. 2, 1967 and now abandoned; Ser. No. 713,997, filed Mar. 18, 1968; and Ser. No. 714,003, filed Mar. 18, 1968, all of Burk, Jr. et al. and incorporated herein by reference. The hydroxamic acids which can be used to produce the cyclic nitrile carbonate reactants of the invention include those represented by the structure:

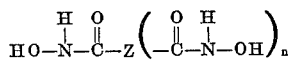

wherein Z is a monovalent or polyvalent organic radical which often has 1 to about 30 or 50 carbon atoms. Z can be aliphatic, aromatic or mixed aromatic-aliphatic groups. When the poly(nitrile carbonates) are to be made, the $n$ of the hydroxamic acid is 1 to 3, preferably 1 to 2; and when producing the mono(nitrile carbonates), $n$ is 0, When Z contains an aromatic hydrocarbon radical, it often has 1 to 3 aromatic rings (either non-fused, as in the case of phenylalkylphenyl radicals, or fused, as in the case of naphthyl radicals) and the radical usually contains 6 to about 30 or more carbon atoms, preferably 6 to 12 carbon atoms. Preferably the hydroxamic acid groups are in a non-ortho position with respect to one another on the aromatic ring.

The system of nomenclature employed herein for designating the hydroxamic acids is that wherein the hydroxamic acid is named as a derivative of the Z group in the above structural formula. Thus, where $n$ is 0 and Z is n-propyl (i.e., —CH₂—CH₂—CH₃) then the acid has the structural formula:

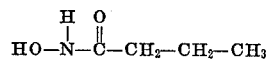

and is designated propane-1-hydroxamic acid. The nitrile carbonates are likewise named as derivatives of their R groups. Thus, for example, the term "butane-1,4-di(nitrile carbonate)," as used herein, designates the cyclic nitrile carbonate having the structural formula:

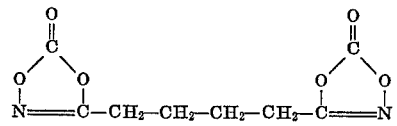

The aromatic hydroxamic acid reactants include, for instance, benzenehydroabic acids, naphthalenehydroxamic acids, anthracenehydroxamic acids, phenylbenzenehydroxamic acids, phenylnaphthalenehydroxamic acids, diphenylalkanehydroxamic acids, dinaphthylalkanehydroxamic acids, etc. Illustrative aromatic polyhydroxamic acids suitable for use as reactants in the preparation of the aromatic polynitrile carbonates include, for instance, the following: benzene-1,3-dihydroxamic acid; benzene-1,4-dihydroxamic acid; benzene-1,3,5-trihydroxamic acid; dialkylbenzenedihydroxamic acids such as 1,4-dimethylbenzene-2,5-dihydroxamic acid and 1,3-diethylbenzene-2,4-dihydroxamic acid; monoalkylbenzenedihydroxamic acids such as methylbenzenedihydroxamic acids, n-hexylbenzenedihydroxamic acids, and pentadecylbenzenedihydroxamic acids; monoalkylbenzenetrihydroxamic acids such as 2-methylbenzene-1,3,5-trihydroxamic acid; 1-benzylbenzene-2,4-dihydroxamic acid; naphthalene-1,7-dihydroxamic acid; naphthalene - 1,3,5 - trihydroxamic acid; 1,2,3,4 - tetrahydronaphthalenedihydroxamic acids; 2,2-diphenylpropane-p,p'-dihydroxamic acid; diphenylmethane - p,p' - dihydroxamic acid; halobenzenepolyhydroxamic acids such as 5 - chlorobenzene - 1,3 - dihydroxamic acid and 4-bromobenzene-1,3,5-trihydroxamic acid; nitrobenzenepolyhydroxamic acids such as 3-nitrobenzene - 1,4 - dihydroxamic acid; anthracene-2,8-dihydroxamic acid; 1,2 - diphenylethane - p,p'-dihydroxamic acid; biphenyldihydroxamic acids; 1,2-diphenylethane-o,o' - dihydroxamic acid; stilbene-p,p'-dihydroxamic acid; andstilbene-o,o'-dihydroxamic acid. Illustrative examples of aromatic poly(nitrile carbonates) include those corresponding to the foregoing aromatic polyhydroxamic acids, such as benzene-1,3-di(nitrile carbonate); benzene-1,4-di(nitrile carbonate); etc.

Aromatic monohydroxamic acids suitable for use as reactants in the preparation of the aromatic mono(nitrile carbonates) include, for instance, the following: benzenehydroxamic acid; the monohydroxamic acids of alkylated benzenes such as methylbenzenehydroxamic acids, dimethylbenzenehydroxamic acids, cyclohexylbenzenehydroxamic acids, and dodecylbenzenehydroxamic acids; naphthalenehydroxamic acids; 1,2,3,4 - tetrahydronaphthalenehydroxamic acids; p - chlorobenzenehydroxamic acid; p - bromobenzenehydroxamic acid; m-nitrobenzenehydroxamic acid; biphenylhydroxamic acids such as p-phenylbenzenehydroxamic acid; anthracenehydroxamic acids; 4-phenylethylbenzene-1-hydroxamic acid; and the like. Illustrative examples of aromatic mono(nitrile carbonate) include those corresponding to the foregoing hydroxamic acids, such as benzene(nitrile carbonate); the mono(nitrile carbonates) of alkylated benzenes, such as methylbenzene(nitrile carbonates), dimethylbenzene(nitrile carbonates); etc.

Illustrative aliphatic polyhydroxamic acids suitable for use as reactants in the preparation of the aliphatic poly(nitrile carbonates) include the following: propane-1,3-dihydroxamic acid; butane-1,4-dihydroxamic acid; pentane - 1,5 - dihydroxamic acid; hexane-1,6-dihydroxamic acid; heptane-1,7-dihydroxamic acid; octane-1,8-dihydroxamic acid; heptane-1,3,6-trihydroxamic acid; cyclohexanedihydroxamic acids; 4 - bromodecane - 1,6-dihydroxamic acid; 2 - chlorononane - 1,9-dihydroxamic acid; etc. Illustrative examples of aliphatic poly(nitrile carbonates) include those corresponding to the foregoing hydroxamic acids, such as propane-1,3-di(nitrile carbonate); butane-1,4-di(nitrile carbonate); etc.

Illustrative aliphtaic monohydroxamic acids suitable for use as reactants in the preparation of the aliphatic mono(nitrile carbonates) include the following:

methanehydroxamic acid;
ethanehydroxamic acid;
propane-1-hydroxamic acid;
propane-2-hydroxamic acid;
butane-1-hydroxamic acid;
2-methylpropane-1-hydroxamic acid;
pentane-1-hydroxamic acid;
3-propylheptane-2-hydroxamic acid;
cyclohexanehydroxamic acid;
3,5-dimethylhexane-1-hydroxamic acid;
2-methylbutane-1-hydroxamic acid;
nonane-1-hydroxamic acid;
decahydronaphthalenehydroxamic acids;
dodecane-1-hydroxamic acid;
2-propyldodecane-1-hydroxamic acid;
heptadecane-1-hydroxamic acid;
pentadecane-1-hydroxamic acid;
docosane-1-hydroxamic acid;
1-butene-4-hydroxamic acid;
1-octene-8-hydroxamic acid;
7-ethyl-1-octene-8-hydroxamic acid;
6,8-dimethyl-1-decene-10-hydroxamic acid;
1-dodecene-12-hydroxamic acid;
8-heptadecene-1-hydroxamic acid;
1-hexadecene-16-hydroxamic acid;
4-chlorobutane-1-hydroxamic acid;
3,5-dibromohexane-1-hydroxamic acid; and
8-nitrooctane-1-hydroxamic acid.

Illustrative examples of aliphatic mono(nitrile carbonates) include those corresponding to the foregoing hydroxamic acids such as methanenitrile carbonate; ethanenitrile carbonate; propane-2-nitrile carbonate; etc.

The temperature for effecting the reaction of the hydroxamic acid and phosgene may vary depending upon the particular hydroxamic acid selected but in all cases should be conducted below the temperature at which either the hydroxamic acid or the desired cyclic nitrile carbonate decomposes. Reflux temperatures can also be used as long as the reflux temperature of the particular mixture is below the decomposition temperatures of the hydroxamic acid and the corresponding cyclic nitrile carbonate produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and superatmospheric pressure can be employed if desired.

Either the hydroxamic acid reactant or the phosgene reactant can be in excess but it is preferred that at least a stoichiometric amount of the latter be used, that is, a ratio of at least one mole of phosgene per mole of hydroxamic acid substituent. Advantageously, the hydroxamic acid is first dissolved or slurried in a suitable organic solvent. Illustrative of suitable solvents are normally liquid organic ethers and esters, acetonitrile, and the like. A preferred solvent is dioxane.

The reaction is often over in less than about 0.5 hour, for example 15 minutes, or in about 5 to 20 hours, depending upon the particular hydroxamic acid and reaction temperature employed, and is marked by a cessation in hydrogen chloride gas evolution. Normally at least about 0.5 hour is required for the reaction to go to completion at temperatures which minimize side reactions. The reaction is usually quite rapid as the hydroxamic acid reactant is dissolved. At the lower reaction temperatures the hydroxamic acid reactant, as it forms the cyclic nitrile carbonate, is generally slow to dissolve due to the slow reaction rate.

The cyclic nitrile carbonate can be recovered from the resulting solution by any desirable means, for example, by first filtering the solution to remove any unreacted starting materials and subjecting the filtrate to reduced pressure to remove unreacted phosgene and inert solvent, if employed, and provide the cyclic nitrile carbonate as a crude product. Alternatively, prior to the filtering step the solution can be cooled to crystallize out the product, which can be recovered as desired. The crude product can be either crystalline or liquid depending on the particular cyclic nitrile carbonate prepared. A purer product can be obtained by recrystallization techniques as, for instance, from a suitable solvent such as dichloromethane, carbon disulfide, ethyl acetate, benzene and the like, or mixtures thereof.

The nucleophilic organic compounds reacted with the cyclic nitrile carbonates according to the present invention are organic compounds having at least one reactive hydrogen atom and include compounds having the reactive hydrogen present in one or more hydroxyl, primary amino, secondary amino, or mercapto groups. These nucleophilic compounds may be simple compounds of relatively low molecular weight, or they may be high molecular weight compounds such as polymeric materials, for instance, having molecular weights of at least about 200 up to about 75,000 or more. The nucleophiles can be mono-functional, that is, containing one reactive hydrogen, or polyfunctional (including difunction), that is, containing more than one reactive hydrogen. The preferred nucleophilic compounds contain a reactive hydrogen at terminal ends of the longest chain of the molecule.

In accordance with the invention, one or more of the nucleophilic compounds may be reacted with the cyclic nitrile carbonate to provide a variety of organic products containing urethane, urea, or thiourethane groups, or mixtures of the foregoing. The products may be monomeric or polymeric depending upon the cyclic nitrile carbonate and nucleophile selected, the proportions of reactants employed and the reaction conditions utilized. The following illustrates some of the types of reactions and products contemplated by the invention. In the formulae employed, R is an organic radical, e.g. hydrocarbon, as defined above in the structure of the cyclic nitrile carbonate reactant, and H—A and H—A—H are monofunctional and difunctional nucleophilic compounds, respectively, wherein H is reactive hydrogen.

A. Reaction of Cyclic Mono(Nitrile Carbonate)+Monofunctional H-Containing Reactant

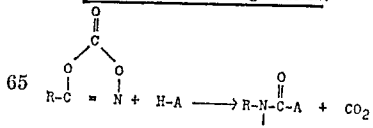

B. Reactions of Cyclic Mono(Nitrile Carbonate) + Difunctional H-Containing Reactant (1)

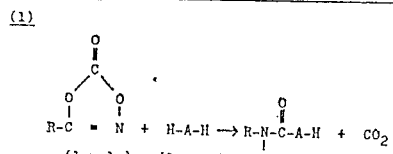

(1 mole)   (1 mole)

(2)

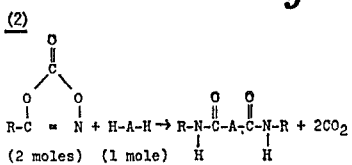

C. Reactions of Cyclic Di(Nitrile Carbonate) + Monofunctional H-Containing Reactant (1)

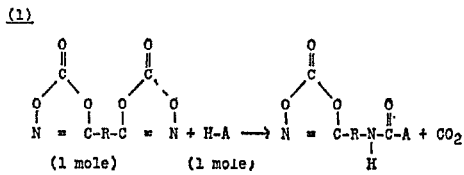

(2)

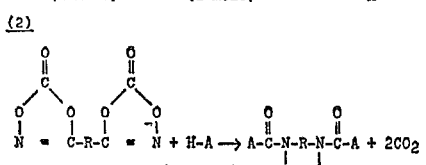

D. Reactions of Cyclic Di(Nitrile Carbonate) + Difunctional H-Containing Reactant (1)

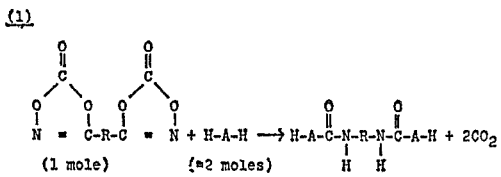

(2)

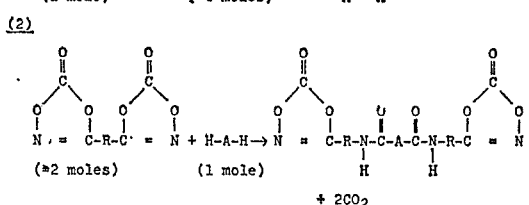

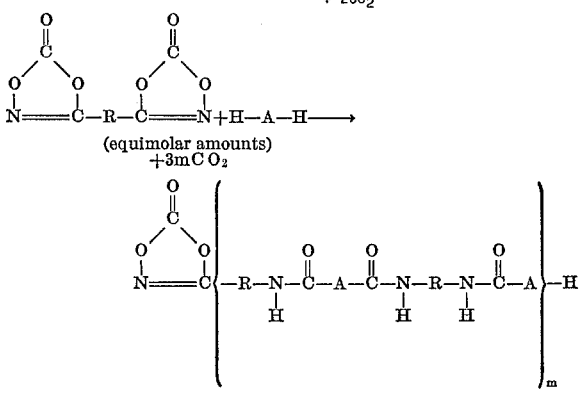

(wherein $m$ is a number sufficient to give products having molecular weights (weight average) of at least about 150,000 or even at least about 300,000).

It should be understood that reactions similar to those generally illustrated above can also be carried out with a reactant containing more than two cyclic nitrile carbonate groups. Likewise, H-containing reactants having a plurality of reactive hydrogens, examples of which are given below, may also be used, for instance, to prepare cross-linked polymers. The structure of —A— in the reactions illustrated above is determined by the particular nucleophile reactant utilized and is the residue of the nucleophile remaining after loss of H. In the reactions illustrated, more than one type of nucleophile can be used, either as a mixture or in a subsequent reaction.

As can be seen from the reactions illustrated above, the reaction of the cyclic nitrile carbonate and nucleophile is of the condensation type; that is, the reaction proceeds by uniting, or combining, two or more molecules with the separation, or elimination, of another, simpler substance—in this case, $CO_2$. Thus, the resultant products may be, for example, either urethanes, ureas, or urea-urethanes, depending upon whether the nucleophile employed contains a hydroxyl group, an amine group, or a mixture of the two.

The catalyst combination of the present invention is one which provides for dissolution of the two metal components in the reaction mixture at the conditions, e.g., temperature, employed for the condensation reaction. The degree of solubility required is, generally, that sufficient to provide that catalytically-effective amounts of the two metals are dissolved therein.

The catalyst combination of the two metals is used in minor, catalytically-effective amounts to catalyze the condensation reaction between the nucleophile and the cyclic nitrile carbonate. Generally, a sufficient quantity of the catalyst combination will be employed to provide about 10 to 500, preferably about 100 to 300, p.p.m. of the Groups III–V metal (calculated as free metal) based on the weight of the total reactants. The condensation reaction of the invention proceeds under atmospheric pressure, although sub- and superatmospheric pressures can be used, if desired.

The proportions of reactants are dependent essentially upon the types of products desired. When a monomeric product is desired the cyclic nitrile carbonate reactant and nucleophile can be in stoichiometric proportions or an excess of either can be used. When a polymeric product is desired, the ratio of nitrile carbonate groups to nucleophilic groups usually falls in the range of about 0.7 to 10:1. In the preparation of elastomers the ratio of nitrile carbonate groups to nucleophilic groups is ordinarily kept near unity. In the preparation of prepolymers, on the other hand, an excess of the nitrile carbonate compound is used, for instance about 1.5 to 10 equivalents, preferably about 2 to 4 equivalents, of nitrile carbonate groups per equivalent of nucleophilic group. Should mixtures of different nucleophilic compounds be employed in the reaction they can be present in any desired mole ratio. Advantageously, urea-urethane elastomeric products are obtained, however, by employing hydroxyl-to-amine molar equivalent ratios of about 0.01 to 100:1, preferably about 1 to 10:1. The reactions can be performed under bulk reaction conditions but, as hereinbefore stated, they may also take place with the reactants dispersed in a non-reactive medium. Advantageously, this medium will be one which dissolves both reactants to at least some extent.

Representative of the more common nucleophilic compounds which can be reacted with the cyclic nitrile carbonate compounds according to the method of the invention are those disussed below under separate headings.

Organic compounds containing mercapto or hydroxyl groups or both

These compounds include aliphatic, aromatic and mixed aliphatic-aromatic, monofunctional and polyfunctional alcohols and thiols, hydroxyl-containing mono- and polyesters, mercapto-terminated polymeric materials, etc.

Representative of aliphatic and aromatic monofunctional alcohols and thiols are methanol, ethanol, propanol, n-butanol, n-pentanol, n-pentenols, n-hexanol, n-heptanol, n-decanol, n-butenols, phenols, naphthols, xylenols, hydroxytoluenes, etc., and the thiol analogues of the foregoing. The aliphatic and aromatic polyfunctional alcohols and thiols include, for example, ethylene glycol; diethylene glycol; thiodiethylene glycol; propylene glycol; 1,3-butylene glycol; 1,6-hexanediol; butenediols; butynediols; amylene glycols; 2-methylpentanediol-2,4; 1,7-heptanediol; glycerine; neopentyl glycol; trimethylol propane; pentaerythritol; di(hydroxymethyl)cyclohexanes; sorbitol; mannitol; galactitol; talitol; xylitol; 1,2,5,6-tetrahydroxyhexane; vinylphenylethylene glycols; bis($\beta$-hydroxyethylphenyl)propanes; silanediols, e.g., diphenyldihydroxysilane; 1,4-dihdroxybenzene; etc., and the thiol analogues of the foregoing.

The reactive hydrogen-containing polymeric compounds useful in this invention include, for instance, polyhydric poly(alkylene ethers), hydroxyl group-containing mono-esters and polyesters, hydroxyl group-containing, preferably hydroxy group-terminated, polymers, and the thiol analogues thereof. The polyhydric poly(alkylene ethers) may often have a molecular weight greater than about 750 and a hydroxyl number of from about 40 to 150 and may be derived, for example, by the polymerization of alkylene oxides such as ethylene oxide, propylene oxide, butylene oxide and the like. Polyhydric poly(alkylene ethers) may also be prepared by the polymerization of the cyclic ethers such as, for example, dioxane, tetrahydrofuran, and the like, and by the condensation of an alkylene oxide with a polyol, e.g., a glycol such as ethylene glycol, propylene glycol, butylene glycol and the like, or a triol such as trimethylolethane, trimethylolpropane and the like. Often preferred are those poly(alkylene ether) glycols wherein the repeating alkylene group has from 2 to 4 carbon atoms.

The hydroxyl group-containing mono- and polyesters may be obtained by the reaction of aliphatic or aromatic, mono- or polycarboxylic acids with aliphatic or aromatic, mono- or polyhydric alcohols in the manner well known to the art in proportions that result in esters having at least one reactive hydroxyl group. Suitable monocarboxylic acids include, for example, formic, acetic, pentanoic, hexanoic, and the like saturated and unsaturated fatty acids; hydroxy carboxylic acids such as β-hydroxypropanoic acid, α and β-hydroxybutanoic acid, m- and p-hydroxybenzoic acids, salicylic acid, hydroxystearic acids, ricinoleic acid, and the like; naphthoic acids, benzoic acid, oleic acid, etc. Any polyhydric alcohols or thiols may be used to form the hydroxyl or thiol group-containing esters and illustrative of such alcohols are those listed above in the discussion of suitable alcohols as the reactive hydrogen-containing reactant. Included within the suitable esters are the mono- and diglycerides and hydroxyl-containing castor oil, tall oil, soya oil, linseed oil, etc. The latter esters are usually prepolymers prepared by the reaction of the fatty glyceride with low molecular weight polyols. Illustrative, for instance, of castor oil-based prepolymers are: propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythritol tetraricinoleate. Often preferred as polyfunctional nucleophilic compounds are the hydroxyl-terminated polyesters prepared by condensation of one or more aliphatic polyhydroxyl alcohols, such as those mentioned above, with one or more aliphatic, including cycloaliphatic, or aromatic polycarboxylic acids or esters. The hydroxyl values of siutable such polyesters will often be in the range of about 25 to 150. The polyhydroxyl alcohols used to prepare such polyesters are often predominantly diols, and the acids are frequently dicarboxylic acids (including their anhydrides) and preferably contain from 4 to 50 carbon atoms, e.g., adipic acid, sebacic acid, phthalic acid, dimers of olefinically-unsaturated monocarboxylic acids (such as linoleic acid dimer), etc.

Other suitable polymeric compounds include the hydroxyl- or thiol-terminated polymers of polymerizable, ethylenically unsaturated compounds such as alpha-olefins of up to about 12 carbon atoms, e.g., 1,3-butadiene, isoprene, 2,3-dimethyl-butadiene, ethylene, propylene, butene-1, etc., and other ethylenically unsaturated compounds such as styrene, acrylonitrile, acrylic acid and esters thereof, methacrylic acid and esters thereof, 2-chloro-1,3-butadiene, 2-cyano-1,3-butadiene, vinyl chloride, vinylidene chloride, and the like; hydroxyl-terminated condensates of phenol and lower aldehydes; and hydroxyl-terminated polyepoxides.

Organic compounds containing primary or secondary amino groups

These compounds include, for example, aliphatic and aromatic, primary and secondary, mono- and polyamines. Aliphatic (including cycloaliphatic), aromatic or mixed aliphatic-aromatic amines can be employed, and these may contain other substituents which may be reactive or nonreactive with isocyanate groups. Suitable amines include methylamine, ethylamine, propylamine, butylamine, pentenylamines, octylamine, decylamine, diphenylamine, phenylamine, α- and β-aminonaphthalenes, 2,5-diaminonaphthalene, methane diamine, ethylene diamine, hexamethylene diamine, diethylene triamine, tetraethylene pentamine, cyclohexylene diamines, p-phenylene diamine, 4,4′-methylene-bs(2-chloroaniline) ("MOCA"), 3,3′ - dichlorobenzidine ("DCB"), N,N′ - di - sec-butyl-p-phenylene diamine, N,N′-dibenzylethylene diamine, diamino diphenyl ethers, p,p′-diaminodiphenylmethane, polyphenylmethylene polyamines, etc. Preferred polyamines are those having up to about 40 or more carbon atoms, most preferably about 6 to 15 carbon atoms. The diamines are frequently preferred, as are those of an aliphatic including cycloaliphatic) structure, since these are especially advantageous if it is desired to provide a polycondensation product with good resistance to the degradative and yellowing effects of ultraviolet light.

Organic compounds containing both hydroxyl or mercapto groups and primary or secondary amino groups These compounds include, for instance, aminoalcohols and aminophenols such as ethanolamine, diethanolamine, 3-aminopropanol, 4-aminobutanol, 5-aminopentanol, 6-aminohexanol, 10-aminodecanol, p-aminophenol, 6-amino-5-methylhexanol, etc. There can similarly be employed the thiol analogues of the foregoing.

The reaction which is catalyzed by the improved method of the present invention may be carried out as a single stage operation or in multiple stages employing more of the same or different cyclic nitrile carbonate reactant or the same or different H-containing nucleophilic compound. Thus, in polymer product production, the process, for example, may be what is termed in the art as a "one-shot" process. Alternatively, a prepolymer of the nitrile carbonate reactant and the active hydrogen-containing reactant can be prepared by employing an excess of either reactant but preferably an excess of the cyclic nitrile carbonate reactant. The prepolymer formed may then be subsequently reacted with either more of the same or a different cyclic nitrile carbonate reactant or with more of the same or a different nucleophile depending on the groups terminating the ends of the prepolymer.

When the nucleophilic compound contains an active hydrogen in a hydroxyl group, then mono- or polyurethane products are prepared, while if the group containing the active hydrogen is an amino group, mono- or polyurea products are obtained. Reaction of the cyclic nitrile adduct reactant with both an hydroxyl group-containing compound and an amino group-containing compound, either simultaneously or sequentially, provides urea-urethane products. And when the nucleophilic compound contains an active hydrogen in a mercapto group, then mono- or polythiourethane products are obtained.

As indicated above, the improved process of the present invention has been found to be capable of providing polycondensation products having exceptionally high molecular weights, for example having weight average molecular weights of about 150,000 or higher. Moreover, where these polycondensation products are prepared from difunctional cyclic nitrile carbonates and difunctional nucleophilic compounds they are soluble in a variety of organic solvents, such as chloroform, tetrahydrofuran, dimethylformamide, dimethylsulfoxide, and aromatic hydrocarbon solvents. This unique solubility characteristic of the high molecular weight polymers is apparently a result of a substantially linear (i.e., non-crosslinked) configuration of the polymer molecules, which configuration is further evidenced by the thermoplastic character of the products. Especially preferred polycondensation products of the present invention are those having weight average molecular weights of at least about, say, 200,000 or even 300,000, and further unique are those products of greater than about 500,000 molecular weight. Preferably these are obtained from difunctional reactants and are soluble in, for example chloroform, although it is recognized that even the difunctional reactants-derived products of the present invention become less soluble as their molecular weights increase.

The use of certain catalyst combinations of the present invention may not provide the preferred, organic solvent-soluble polycondensation products. Thus, for example, where calcium is used as the Groups I, II, or iron series metal, otherwise linear product molecules may be crosslinked via bonding with the calcium cation to result in an insoluble product. Even those high molecular weight products of the present invention which are not soluble, however, may still be unique for their thermoplastic properties.

In general, then, the method of the present invention can be utilized to prepare higher molecular weight products, e.g., polyurethanes, than can be made by employing other condensation reaction catalysts, such as the amine catalysts, for example. Also, the method of the present invention, when used to prepare polycondensation products such as polyurethanes from difunctional reactants, can provide organic solvent-soluble, thermoplastic products of much higher molecular weights than have been obtainable by the conventional isocyanate reactions.

A further advantage of the process of the present invention is that the condensation reaction proceeds without the formation of the hydroxamates which are produced, either as intermediates or as end products, when no catalyst is employed or when catalysts such as amines are used. The formation of such hydroxamates, which inhibits the preparation of high molecular weight polycondensation products, is discussed in our above-mentioned application Ser. No. 592,288. Thus, for example, a hydroxamate is obtained as an intermediate in the amine-catalyzed condensation of a difunctional cyclic nitrile carbonate with a difunctional nucleophilic compound according to the following reaction:

N,N'-dinitroso-terephthalamide para,para'-oxybis(bezenesulfonic acid), azodicarbonamide, benzene sulfonyl hydrazide, azodiisobutyronitrile, paratertiary butyl benzoylazide and the like.

Formulation of polyurethane foams can follow the well esablished practice of the art with the notable exception that the conditions of the reaction between the cyclic nitrile carbonate compound and nucleophilic compound be controlled to effect the reaction at a rate slow enough to preclude escape of the evolved $CO_2$ gas before gelation to the extent sufficient to entrap the evolved gas and form a cellular, elastomeric polyurethane has occured. Ordinarily, the desired reaction speed can be acquired by selection of a suitable catalyst concentration, usually below about 0.1% by weight of the reactants. Catalyst concentrations much above this level tend to liberate the gas prior to the establishment of sufficient gelation to cause entrapment.

When preparing foamed products by the method of the present invention it is generally preferred to employ at least a trifunctional reactant, which can be either the cyclic nitrile carbonate, the nucleophilic compound, or both. Thus, for example, excellent polyurethane foams can be prepared by condensing a difunctional cyclic nitrile carbonate with a triol to yield a cross-linked product.

If desired, surface active agents might be used in concentrations of about 1 to 5% by weight of the reactants to stabilize the foam. Generally used are silicone emulsifiers and non-ionic surface active agents such as ethylene oxide condensates of vegetable oils, alcohols, and organic acids.

In accordance with the usual practice, inert, inorganic or organic fillers, or both, and other additives may be included in the reaction mixture. Suitable inert, inorganic materials include, for example, clay, talc, silica, carbon black, asbestos, glass, mica, calcium carbonate, antimony oxide and the like. Organic fillers include, for instance, the various polymers, copolymers and terpolymers of vinyl chloride, vinyl acettae, acrylonitrile, acrylamide, styrene, ethylene, propylene, butadiene, divinylbenzene, etc. Other additives which may be added include plasticizers such as dioctyl phthalate, di(2-ethylhexyl)adipate, etc., extenders, softeners, coloring agent and emulsifiers.

The products produced by the invention have many uses. For example, the products are excellent materials for use in the preparation of castings, molds, sealants,

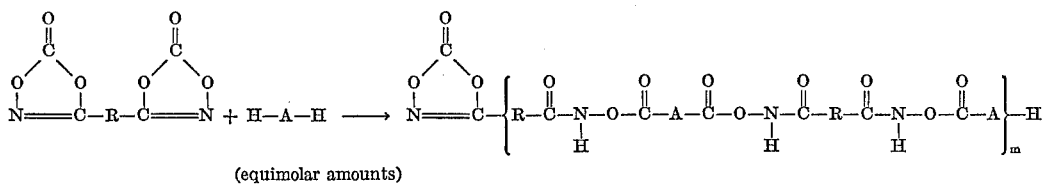

(equimolar amounts)

Such hydroxamate formation is avoided bythe process of the present invention.

It is possible in accordance with the present invention to produce cellular or nonporou splastics, including films, coatings, adhesive layers, impregnated compositions, castings, moldings and the like. However, in the production of polyurethane foams by the process of the invention it is not necessary, as it is in conventional prior art processes, to employ an extraneous foaming or blowing agent since the cyclic nitrile carbonate reactants contain their own internal or "built in" blowing agent, namely the carbon dioxide gas they evolve during reaction with the nucleophilic compounds. Conventional foaming agents, however, may be employed if desired, among which may be listed: low boiling solvents such as benzene, toluene, acetone, ethyl ether, butyl acetate, methylene dichloride, carbon tetrachloride and the like, as well as agents which will decompose to evolve an inert gas as, for instance, ammonium carbonate, sodium bicarbonate, N,N'-dimethylpotting compounds, insecticides, adhesives, coatings, films, etc.

Suitable reaction temperatures for the process of the present invention will vary according to the particular reactants employed, etc., but will often be in the range of about 40 to 150° C., preferably about 80 to 140° C. Where the catalyst combination employed is a bimetallic salt of the formula $Mc^+(MaX)^-$, as hereinbefore discussed, the condensation reaction is preferably conducted at temperatures below the decomposition temperature of the salt. Reaction times will also vary and, where polymeric condensation reaction products are prepared, will be dependent to some extent on the molecular weight desired for the product. Usually the reaction will be complete in about 1 to 12 hours, often in about 1 to 5 hours.

To prepare the catalyst combination used in the improved method of the present invention the two metals will generally be pre-admixed or pre-associated with on another before they are contacted with the cyclic nitrile carbonate reactant. This pre-admixing is usually carried out at from about room temperature to 100° C.; active catalyst combinations can result, however, even if the pre-admixing is carried out below room temperature or above 100° C. Advantageously, the catalyst combination is pre-admixed in a solvent therefor, and the resultant catalyst solution is what is used to catalyze the condensation reaction between the cyclic nitrile carbonate and the nucleophile. Accordingly, the solvent is one which can either be removed from the mixture prior to initiating the condensation reaction, or whose presence in the final product is not undesirable; also, it must not serve to inactivate the catalyst combination. Where, for example, the nucleophilic reactant is a hydroxyl-containing compound—the desired product, theerfore, being a urethane—it is often preferred to use a lower fatty alcohol solvent for the catalyst combination. Moreover, the alcohol solvent can be the hydroxy-containing nucleophilic reactant, if desired, or it can be an extraneous alcohol.

As indicated earlier, another advantageous selection of catalyst solvent can be made where one of the metals is to be supplied in the form of an alcoholate, e.g., an alkali metal alkoxide. In this instance, there can be employed as the catalyst solvent the alcohol from which the alkali metal alkoxide is derived and the latter component can be prepared in situ in the pre-admixing of the catalyst combination. Thus, for example, where the alkali metal compound to be employed is sodium tert-butoxide, the catalyst combination can be pre-admixed by adding metallic sodium and the Groups III–V metal compound to an excess of dry tert-butanol.

Generally, then, suitable alcohol solvents for the catalyst combination may be mono-, di-, tri- or polyols ranging in molecular weight from about 32 to 10,000. The concentration of a pre-admixed solution of the catalyst combination can vary, for instance, from about 10 p.p.m. to 0.5 gram per ml. of solution (based on the weight of the Groups III–V metal, calculated as the free metal).

The method of the present invention has been found to be particularly suitable for the preparation of urethanes, and especially polyurethanes, via the condensation reaction of the cyclic nitrile carbonate compounds with hydroxyl-containing nucleophilic compounds.

In the production of monomeric urethanes the preferred reaction conditions involve using excess hydroxyl-containing nucleophile, based on the amount of carbonate, and temperatures between about 60 and 150° C. For the production of polymeric materials, polyols are employed which preferably have been previously degassed at about 50 to 150° C. and 0.25 to 50 mm. Hg pressure for from 15 to 60 minutes. After the addition of the catalyst combination, further degassing from about 1 to 4 hours under the same conditions may be conducted. After addition of catalyst and such further degassing, a nitrogen atmosphere is advantageously created and maintained in the reaction vessel, during which time the desired poly(nitrile carbonate) is added, preferably in small portions over periods of, say, about three minutes to two hours. During the addition of the carbonate the reaction mixture can be stirred and the temperature advantageously maintained between about 80 to 150° C. It is further preferred that, following complete addition of the carbonate, the temperature of the reaction be maintained between about 80 to 150° C. for from about one hour to 12 hours, depending specifically on variables employed in carrying out the polymerization. The continued heating can, if desired, be carried out under reduced pressures of from about 100 to 0.2 mm. Hg.

The invention will be better understood by reference to the following examples.

EXAMPLE I

Catalyst: Tin plus sodium

To prepare the catalyst, a solution of sodium tertiary butoxide (made by dissolving 5.3 mg. (0.00024 mol) of metallic sodium in 6 ml. of dry tertiary butanol) was added to 30 g. (0.03 mol) of poly(tetramethylene ether) glycol (M.W.:1000; hydroxyl No. 112) contained in a 100 ml. resin kettle. This glycol had been previously degassed for one hour at 15 mm. Hg pressure and 100° C. The glycol at the time of addition was at 100° C. and under a nitrogen atmosphere. The reaction mixture was again degassed at 100° C. to remove tertiary butanol; then, 40 mg. of dibutyltin oxide was added and degassing continued for an additional two hours. Maintaining the temperautre at 100° C., the evacuated reaction kettle was continuously purged with nitrogen, while 6.84 g. (0.03 mol) of butane-1,4-di(nitrile carbonate) was added over a period of ten minutes. Within five minutes after completion of the addition of the nitrile carbonate, the reaction mixture had gelled. The reaction mixture was heated an additional 2 hours under vacuum at which time it was a non-sticky, soft, rubbery polymer. This polymer had a $\overline{M}_w$ of 248,000 and a $\overline{M}_n$ of 108,000, as determined by gel permeation chromatographic (GPC) analysis. ($\overline{M}_w$ represents "weight average molecular weight"; that is, the mean molecular weight of all molecules present. $\overline{M}_n$ represents "number average molecular weight"; that is, the quotient obtained by dividing the sum of the molecular weights of all of the molecules present by the number of molecules present.) The polymer was soluble in chloroform, tetrahydrofuran, and dimethylformamide and its infrared spectrum in chloroform showed bands at 2.95μ (indicative of N—H stretching) and at 5.87μ

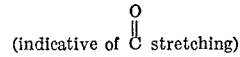

(indicative of C stretching)

which bands are characteristic of polyurethanes.

EXAMPLE II

Catalyst: Tin plus sodium

To prepare the catalyst, metallic sodium (3.6 mg., 0.00015 mole) and 37.6 mg. (0.00015 mol) of dibutyltin oxide were added to 4 ml. of dry tertiary butanol. After the sodium had dissolved, the entire catalyst solution, including any solid, was added to 30 g. (0.03 mol) of the degassed glycol described in Example I. At 100° C. and 15 mm. Hg pressure the reaction mixture was again degassed for three hours, then the polymerization was carried out as described in Example I. Gel time was 10 minutes. The polymer obtained had a $\overline{M}_w$ of 375,000 by GPC analysis and a $\overline{M}_n$ of 46,000 by GPC and Membrane Osmometry analysis. The solubility of the polymer and its infrared spectrum were identical to the polymer of Example I.

EXAMPLE III

Catalyst: Tin plus sodium

To prepare the catalyst, metallic sodium (27 mg., 0.0011 mol) was dissolved in dry tertiary butanol (6 ml.), and then stannic chloride (10 mg., 0.00004 mol) was added. Using this catalyst system the polymerization was carried out as described in Example II except that the nitrile carbonate was added over a period of three minutes. The reaction mixture gelled in five minutes to a non-sticky, soft, rubbery polymer. It had a $\overline{M}_w$ of 146,000 and a $\overline{M}_n$ of 47,500 by GPC analysis. Its solubility and infrared spectrum were identical to the polymer of Example I.

EXAMPLE IV

Catalyst: Tin plus sodium

To prepare the catalyst, 10 mg. of NaOH and 40 mg. of dibutyltin oxide were added to 30 g. (0.03 mol) of the degassed glycol described in Example I. The reaction mixture was heated for 4 hours at 100–110° C. under a reduced pressure (15 mm. Hg). The polymerization was then carried out as described in Example I except that the nitrile carbonate was added over a period of 6 minutes and heating was continued for 5½ hours. The polymer obtained had a $\overline{M}_w$ of 250,000 by viscosity measurements. Its solubility and infrared spectrum were identical to the polymer of Example I.

EXAMPLE V

Catalyst: Tin plus potassium

The catalyst preparation and polymerization were carried out as in Example IV except that KOH was used in place of the NaOH. Also, heating was continued for only two hours after complete addition of the nitrile carbonate. The polymer obtained had a $\overline{M}_w$ of 342,000 and a $\overline{M}_n$ of 60,000 as determined by GPC analysis. Its solubility and infrared spectrum were identical to the polymer of Example I.

EXAMPLE VI

Catalyst: Tin plus sodium

The preparation of the catalyst and the polymerization were carried out as described in Example I except that 12% of the theoretical amount of the nitrile carbonate needed was supplied as benzene-1,3-di(nitrile carbonate). The polymer obtained has a $\overline{M}_w$ of 195,000 and a $\overline{M}_n$ of 37,000 by GPC analysis. Its solubility was identical to the polymer of Example I and its infrared spectrum was characteristic of a polyurethane.

EXAMPLE VII

Catalyst: Tin plus sodium

The preparation of the catalyst and the polymerization were carried out as described in Example I except that 12% of the theoretical amount of the nitrile carbonate needed was supplied as benzene-1,4-di(nitrile carbonate). The polymer obtained had a $\overline{M}_w$ of 325,000 and a $\overline{M}_n$ of 57,500 by GPC analysis. This polymer's solubility was identical to Example I and its infrared spectrum was characteristic of a polyurethane.

EXAMPLE VIII

Catalyst: Tin plus sodium

The catalyst was prepared by adding about 40 mg. of dibutyltin dilaurate to dry isopropyl alcohol containing a small amount of NaOH. A white precipitate formed immediately.

To 30 g. (0.03 mol) of the degassed glycol described in Example I was added the entire catalyst solution, including the precipitate. The reaction mixture was degassed at 15 mm. Hg pressure at 105° C. for four hours. The polymerization was then carried out as described in Example I. Gel time was five minutes. Heating was continued for two hours. The polymer produced in this reaction had a $\overline{M}_w$ of 300,000 as determined by viscosity measurements. It was soluble in all organic solvents tested and its infrared spectrum was identical to the polymer of Example I.

EXAMPLE IX

Catalyst: Tin plus potassium

The preparation of the catalyst and polymerization were carried out as described in Example V except that 0.04 ml. of dibutyltin dimethoxide was used in place of the dibutyltin oxide. The polymer was a non-sticky, tough, elastic rubber.

EXAMPLE X

Catalyst: Tin plus potassium

A large amount of catalyst was prepared by drying 100 ml. of n-butanol by azeotroping out water with benzene. To 75 ml. of this dried n-butanol were added 10 g. (0.04 mol) of dibutyltin oxide and 2.24 g. (0.04 mol) of KOH. Benzene was again added and water azeotroped out using a Dean-Stark separator until no more water came over. The benzene was then removed by fractional distillation. The solution remaining in the distillation flask was considered the catalyst solution.

An aliquot (0.3 ml.) of the catalyst solution was added to 30 g. (0.03 mol) of the degassed glycol described in Example I and the resulting soution was degassed at 100–110° C. for two hours. The polymerization was carried out as described in Example I except that all of the nitrile carbonate was added over a period of five minutes. Gel time was seven minutes. This polymer had a $\overline{M}_w$ of 342,000 by viscosity measurements. Its solubility and infrared spectrum were identical to the polymer of Example I.

EXAMPLE XI

Catalyst: Tin plus potassium

Using the catalyst prepared in Example X, polymerization was carried out under the same conditions as described in Example X except that the glycol used was a poly(tetramethylene ether) glycol of 2010 molecular weight and a hydroxy No. of 56. The polymer obtained was a tough, slightly tacky, elastic rubber.

EXAMPLE XII

Catalyst: Tin plus potassium

Using 0.35 ml. of the catalyst prepared in Example X and using 30 g. of a poly(tetramethylene adipate) glycol (mol. wt. of 996 and hydroxyl No. of 112.1), the resulting mixture was degassed for six minutes at 2 mm. Hg pressure and at 110° C., and then the polymerization was carried out as described in Example I except that the nitrile carbonate was added over a period of five minutes. Gel time was fifteen minutes. The resulting polymer, on cooling, was a white, hard polymer and was soluble in chloroform, tetrahydrofuran, and dimethylformamide.

EXAMPLE XIII

Catalyst: Tin plus potassium

A poly(tetramethylene ether) glycol (mol. wt. of 980; hydroxyl No. of 116) which had been degassed under the same conditions as the degassing procedure described in Example I, had added to it 10 mg. of KOH and 0.04 ml. of stannous octanoate. The reaction mixture was degassed at 100° C. and 15 mm. Hg pressure for three hours, and then the polymerization was carried out as described in Example I except that the reaction mixture was heated under vacuum for eight hours after addition of the nitrile carbonate. Gel time was five hours. The polymer obtained had a $\overline{M}_w$ of 160,000. Its solubility and infrared spectrum were identical to the polymer obtained in Example I.

EXAMPLE XIV

Catalyst: Tin plus potassium

This polymerization was carried out in an identical manner to that described in Example XIII except that twice the amount of KOH and stannous octanoate was used. Gelling was immediate after the addition of the nitrile carbonate. The resulting polymer was very tough.

EXAMPLE XV

Catalyst: Tin plus sodium

To prepare the catalyst, sodium tertiary butoxide (made by dissolving 37 mg. of metallic sodium in 6 ml. of dry tertiary butanol) and 37 mg. of dibutyltin dilaurate were added to 30 g. (0.03 mol) of the degassed glycol described in Example I and the resulting solution degassed for one hour at 100° C. and 15 mm. Hg pressure. A nitrogen atmosphere was then effected in the reaction vessel and 5 ml. of dry xylene added; then, 7.44 g. (0.03 mol) of benzene - 1,4 - di(nitrile carbonate) was added. As the polymerization proceeded, additional dry xylene was thrice added in amounts of 3, 2 and 5 ml., respectively, to keep the reaction mixture from becoming too viscous. At the end of five hours $CO_2$ evolution had ceased and the xylene was then removed under reduced pressure.

The resulting polymer was a tough, non-sticky, rubbery material. This polymer had a $\overline{M}_w$ of 302,000 and a $\overline{M}_n$ of 102,000 by GPC analysis.

EXAMPLE XVI

Catalyst: Tin plus sodium

To prepare the catalyst 44.1 mg. (0.0007 mol) of dibutyltin dilaurate was added to 6 ml. of dry t-butanol, then 3.4 mg. (0.00015 mol) of metallic sodium was added. The sodium was allowed to dissolve. This catalyst mixture, which then contained a white solid, was added to 30 g. (0.03 mol) of a poly(tetramethylene ether) glycol having a molecular weight of 1000 and a hydroxyl No. of 112, which was contained in a 100 ml. resin kettle. This glycol had been previously degassed for one hour at 15 mm. Hg pressure at 100° C. The glycol at the time of addition was at 100° C. and under a nitrogen atmosphere. The reaction mixture was again degassed for one hour at 100° C. to remove tertiary butanol. Maintaining the temperature at 100° C., the evacuated reaction kettle was continuously purged with nitrogen while 6.84 g. (0.03 mol) of butane - 1,4 - di(nitrile carbonate) was added over a period of 1½ hours. On completion of the addition of the nitrile carbonate the reaction mixture had gelled. The reaction mixture was heated an additional 2 hours under vacuum at which time it was a non-sticky, soft, rubbery polymer. This polymer had a $\overline{M}_w$ of 475,000 and a $M_n$ of 82,000 by GPC analysis. It was soluble in all organic solvents tested (except alkanes) and its infrared spectrum in chloroform was characteristic of polyurethanes.

EXAMPLE XVII

Catalyst: Tin plus sodium

To prepare the catalyst, sodium methoxide (made by dissolving 18 mg. of metallic sodium in methanol) and 36 mg. of dibutyltin dilaurate were added to 30 g. (0.03 mol) of the degassed glycol described in Example I. The resulting solution was degassed for one hour at 100° C. and 15 mm. Hg pressure. A nitrogen atmosphere was then effected in the reaction vessel and butane-1,4-di(nitrile carbonate) was added in small portions over a 30 minute period. Heating was continued at 108° C. for an additional two hours. The polymer that resulted had a $\overline{M}_w$ of 240,000 and an $\overline{M}_n$ of 48,300 as determined by GPC analysis.

EXAMPLE XVIII

Catalyst: Tin plus sodium

The catalyst was prepared as described in Example XVII but was added to 0.03 mol of difunctional material made up of 80 mole percent of the glycol described in Example I and 20 mole percent of 1,6-hexamethylene diamine. The polymerization was carried out as described in Example XVII. The resulting polymer had a $\overline{M}_w$ of 284,000 and a $\overline{M}_n$ of 47,000 by GPC analysis.

EXAMPLE XIX

Catalyst: Lead plus sodium

To prepare the catalyst, a solution of sodium n-butoxide (made by dissolving 8.7 mg. of metallic sodium in 6 ml. of dry n-butanol) and 207 mg. of a 24 wt. percent solution of lead naphthenate in mineral spirits were added to 20 g. of poly(tetramethylene ether) glycol (mol wt. of 980; hydroxyl No. of 114) contained in a 100 ml. resin kettle. This glycol had been degassed for one hour at 15 mm. Hg pressure at 106° C. The glycol at the time of addition of this catalyst mixture was at 106° C. and under a nitrogen atmosphere. The reaction mixture was again degassed at 106° C. for an additional 2½ hours to remove n-butanol. Maintaining a temperature of 106° C., the evacuated reaction kettle was opened to a nitrogen atmosphere and continuously purged with nitrogen while 4.65 g. of butane - 1,4 - di(nitrile carbonate) was added over a period of seven minutes. Within twelve minutes after completion of the addition of the nitrile carbonate, the reaction mixture had gelled. Heating of the reaction mixture was continued for an additional two hours, at which time the polymer was a non-sticky, rubbery mass. It has a $\overline{M}_w$ of 144,000 by viscosity measurements. It was soluble in all organic solvents tested, including chloroform, tetrahydrofuran, and dimethylformamide, and its infrared spectrum in chloroform was characteristic of polyurethanes.

EXAMPLE XX

Catalyst: Titanium plus sodium

To prepare the catalyst, a solution of sodium n-butoxide (prepared by dissolving 4.0 mg. (0.000174 mol) of metallic sodium in 6 ml. of dry n-butanol) was added to a 100 ml. resin kettle containing 30 g. (0.03 mol) of the same poly(tetramethylene ether) glycol as used in Example XIX. This glycol had been previously degassed for one hour at 15 mm. Hg pressure at 116° J. The glycol at the time of addition was at 116° C. and under a nitrogen atmosphere. The reaction mixture was again degassed at 116° C., and then 0.05 ml. of tetrabutyl titanate was added. The reaction kettle was continuously purged with nitrogen while 6.98 g. (0.03 mol) of butane-1,4-di(nitrile carbonate) was added over a period of ten minutes. The reaction mixture gelled in 1½ hours. Heating of the reaction mixture at 116° C. was continued for an additional 3½ hours after gelation, at which time the reaction mixture was a non-sticky, rubbery mass. It had a $\overline{M}_w$ of 150,000 as determined by viscosity measurements. It was soluble in all organic solvents tested, including chloroform, tetrahydrofuran, and dimethylformamide, and its infrared spectrum in chloroform was characteristic of polyurethanes.

EXAMPLE XXI

Catalyst: Titanium plus sodium

The catalyst was prepared by dissolving 38.5 mg. of sodium in dry n-butanol and then adding 0.015 ml. of titanium tetrachloride. This catalyst mixture was then added to 20 g. of the previously degassed glycol described in Example XX. The resulting reaction mixture was again degassed at 117° C. for two hours. The polymerization was carried out as described in Example XX except that 4.65 g. of butane-1,4-di(nitrile carbonate) was added. Gel time was nine minutes. Total reaction time after addition of the nitrile carbonate was fifteen minutes. The resulting polymer was an extremely tough, rubbery material. It was found to be insoluble in dimethyl formamide and methyl ethyl ketone.

EXAMPLE XXII

Catalyst: Bismuth plus sodium

To prepare the catalyst, a solution of sodium n-butoxide (made by dissolving 24 mg. (0.00105 mol) of metallic sodium in 6 ml. of dry n-butanol) was added to 30 g. (0.031 mol) of the same poly(tetramethylene ether) glycol as used in Example XIX, contained in a 100 ml. resin kettle. This glycol had been previously degassed for one hour at 15 mm. Hg pressure at 117° C. This glycol at the time of addition was at 117° C. and under a nitrogen atmosphere. The reaction mixture was again degassed at 117° C. to remove n-butanol, then 60 mg. of bismuth (III) nitrate was added and degassing continued for an additional 1½ hours. Maintaining a temperature of 120° C., the evacuated reaction kettle was opened to a nitrogen atmosphere and continuously purged with nitrogen while 6.84 g. of butane-1,4-di(nitrile carbonate) was added over a period of six minutes. Within thirty minutes after completion of the addition of the nitrile carbonate the reaction mixture had gelled. Heating of the reaction was continued for an additional two hours at which time the polymer was a non-sticky, rubber mass. It has a $\overline{M}_w$ of 408,000 as determined by viscosity measurements. It was soluble in all organic solvents tested, including chloroform, tetrahydrofuran, and dimethylformamide, and its infrared spectrum in chloroform was characteristic of polyurethanes.

EXAMPLE XXIII

Catalyst: Bismuth plus sodium

The catalyst for this reaction was prepared as described in Example XXII except that 7.5 mg. of sodium was used and bismuth (III) chloride (25 mg.) was used in place of the bismuth (III) nitrate. The polymerization was carried out as described in Example XXII except that the addition time of the nitrile carbonate was 12 minutes. Gel time of the reaction was 12 minutes. After the reaction had gelled, heating was continued for one hour. The polymer obtained had a $\overline{M}_w$ of 315,000 by viscosity measurements. Its solubility and infrared spectrum were identical to the polymer obtained in Example XXII.

EXAMPLE XXIV

Catalyst: Bismuth plus sodium

The catalyst for this reaction was also prepared as described in Example XXII except that 5.8 mg. of sodium was used and bismuth (III) acetate (31 mg.) was used in place of the bismuth (III) nitrate. Preparing the catalyst in this fashion produced a milky solution. The polymerization was carried out as described in Example XXII except that the addition time of the nitrile carbonate was 7 minutes. Gel time of the reaction was 90 minutes. Total reaction time was three hours. The polymer obtained was milk white in color. This polymer dissolved in all organic solvents tested to give a water white solution and bismuth (III) acetate as a precipitate. The polymer had a $\overline{M}_w$ of 130,000 by viscosity measurements. Its solubility and infrared spectrum were identical to the polymer obtained in Example XXII.

EXAMPLE XXV

Catalyst: Aluminum plus sodium

To prepare the catalyst, a solution of sodium n-butoxide (made by dissolving 4.0 mg. (0.000174 mol) of metallic sodium in 6 ml. of dry n-butanol) was added to 30 g. (0.03 mol) of the same poly(tetramethylene ether) glycol as used in Example XIX contained in a 100 ml. resin kettle. This glycol had been previously degassed for one hour at 15 mm. Hg pressure at 117° C. The glycol at the time of addition was at 117° C. and under a nitrogen atmosphere. The reaction mixture was again degassed at 117° C. to remove n-butanol, then 30 mg. of aluminum isopropoxide was added and degassing continued for an additional two hours. Maintaining the temperature at 117° C., the evacuated reaction kettle was opened to a nitrogen atmosphere and continuously purged with nitrogen while 6.84 g. (0.03 mol) of butane-1,4-di(nitrile carbonate) was added over a period of five minutes. Within five minutes after completion of the addition of the nitrile carbonate the reaction mixture had gelled. Heating of the reaction was continued for an additional fifteen minutes, at which time the polymer was a non-sticky, rubbery mass. It had a $\overline{M}_w$ of 356,000 as determined by viscosity measurements. It was soluble in all organic solvents tested, including chloroform, tetrahydrofuran, and dimethylformamide, and its infrared spectrum in chloroform was characteristic of polyurethanes.

EXAMPLE XXVI

Catalyst: Aluminum plus potassium

To prepare the catalyst, 30 mg. of KOH and 25 mg. of aluminum acetate were added to 20 g. (0.03 mol) of the degassed glycol described in Example XXV. The reaction mixture was heated for 2½ hours at 117° C. under reduced pressure (2 mm. Hg). The polymerization was carried out as described in Example XXV except that 4.65 g. of the nitrile carbonate was added over a 7 minute period of time. The reaction mixture gelled in 20 minutes. After the reaction mixture had gelled, the reaction mixture was heated an additional hour under reduced pressure (5 mm. Hg). The polymer obtained had a $\overline{M}_w$ of 150,000 by viscosity measurements. Its solubility and infrared spectrum were identical to the polymer obtained in Example XXV.

EXAMPLE XXVII

Catalyst: Aluminum plus lithium

The catalyst consisted of 4.5 mg. of lithium aluminum hydride dissolved in 6 ml. of dry n-butanol. This catalyst solution was added to 20 g. (0.02 mol) of the degassed glycol described in Example XXV. The reaction mixture was heated for 1 hour at 117° C. under reduced pressure (15 mm. Hg). The polymerization was carried out as described in Example XXVI except that the heating after gel formation was for 2 hours at a pressure of 15 mm. Hg. Gel time was fifteen minutes. The polymer obtained had a $\overline{M}_w$ of 154,000 by viscosity measurements. Its solubility and infrared spectrum were identical to the polymer obtained in Example XXV.

EXAMPLE XXVIII

Catalyst: Aluminum plus lithium

To prepare the catalyst there was added slowly to 100 cc. of absolute ethanol 2 g. of lithium aluminum hydride. An exothermic reaction resulted with hydrogen being evolved. The resulting solution was filtered to remove insolubles and the filtrate evaporated under vacuum, leaving one-quarter ounce of the alkoxo salt, $LiAl(OC_2S_5)_4$, in the form of a white solid. (A sample of the solid was observed to have a melting point greater than 400° C. and to be redissolvable in ethanol.) One hundred fifty-three (153) mg. of the white solid (equivalent to 19.2 mg. of Al) was added to 30 g. of poly(tetramethylene ether) glycol (mol wt. of 980; hydroxyl No. of 114) contained in a glass reaction kettle. This glycol had been degassed for one-half hour at 100° C. and 4 mm. Hg pressure with stirring. The glycol at the time of addition of the white solid was at 104° C. and under a nitrogen atmosphere. The reaction mixture was again degassed at 100° C. for one hour. There resulted a milky, yellow mixture; not all of the solid dissolved. To the resultant mixture was added in small portions over a period of 8 minutes with stirring, 6.98 g. of butane-1,4-di(nitrile carbonate). The last traces of the nitrile carbonate were washed into the reaction mixture using about 30 to 50 cc. of dry meta-xylene. Vigorous $CO_2$ evolution was observed during the addition of the nitrile carbonate. Stirring was continued for 5 minutes after the addition of the meta-xylene. One hour after the beginning of the nitrile carbonate addition the meta-xylene was evaporated from the reaction mixture reduced pressure. About 2 hours after removal of the meta-xylene the reaction product was removed from the kettle and pressed between "Teflon" sheets. The product was a yellow, fairly hard, rubbery material.

EXAMPLE XXIX

Catalyst: Aluminum plus copper

To prepare the catalyst, there was added dropwise to an ethanol solution of the sodium alkoxo salt,

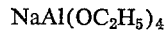

$NaAl(OC_2H_5)_4$ an ethanol solution of cupric chloride. To the resultant 200 cc. of dark green reaction mixture was added 500 cc. of benzene with slight warming. One hundred fifty-eight (158) cc. of reddish brown mother liquor was decanted from the reaction mixture and was determined to be an ethanol/benzene solution of the copper alkoxo salt, $Cu\{Al(OC_2H_5)_4\}_2$, at a concentration of about 5.8 mg. of Al per cc. of solution. Five and one-quarter (5.25)

cc. of this catalyst solution was added to 30 g. of poly(tetramethylene ether) glycol (mol wt. 980; hydroxyl No. of 114) contained in a glass reaction kettle. This glycol had been degassed for one-half hour at 100° C. and 4 mm. Hg pressure with stirring. The glycol at the time of addition of the catalyst solution was at 104° C. and under a nitrogen atmosphere. The reaction mixture was again degassed at 100° C. for one hour. To the resultant mixture was added in small portions over a period of 10 minutes, with stirring, 6.98 g. of butane-1,4-di(nitrile carbonate). The last traces of the nitrile carbonate were washed into the reaction mixture using about 30 to 50 cc. of dry toluene. Vigorous evolution of $CO_2$ was observed during the nitrile carbonate addition, and the reaction mixture gelled before all of the nitrile carbonate was added. The temperature was raised to 115° C. to drive off volatiles. Later, 67.5 cc. of toluene had to be added to keep the mixture fluid. Five hours after the beginning of the nitrile carbonate addition the reaction product was removed from the kettle and pressed between "Teflon" sheets. The product was a yellowish brown, fairly tough, polymeric material having a melting point range of 33 to 35° C. It was difficult to dissolve in methylethyl ketone and in tetrahydrofuran.

EXAMPLE XXX

Catalyst: Aluminum plus nickel

To prepare the catalyst, there was added to 100 cc. of an ethanol solution of the sodium alkoxo salt, $NaAl(OC_2H_5)_4$, 50 cc. of an ethanol solution of nickelous bromide containing some undissolved nickelous bromide. The reaction mixture was filtered after 3¼ hours to yield a light green filtrate which was determined to be an ethanol solution of the nickel alkoxo salt, $Ni\{Al(OC_2H_5)_4\}_2$, at a concentration of about 6.8 mg. of Al per cc. of solution. Four and one-half (4.5) cc. of this catalyst solution was added to 30 g. of poly(tetramethylene ether) glycol (mol wt. of 980; hydroxyl No. of 114) contained in a glass reaction kettle. This glycol had been degassed for one-half hour at 100° C. and 4 mm. Hg. pressure with stirring. The glycol at the time of addition of the catalyst solution was under a nitrogen atomosphere. The reaction mixture, which had changed to a milky white appearance, was again degassed at 100° C. for one hour. To the resultant mixture was added in small portions over a period of 5 minutes, with stirring, 6.98 g. of butane-1,4-di(nitrile carbonate). The last traces of the nitrile carbonate were washed into the reaction mixture using about 30 to 50 cc. of dry toluene. The light green color returned as the nitrile carbonate was added. Vigorous evolution of $CO_2$ was observed during the nitrile carbonate addition and an additional 25 cc. of toluene was added to the reaction mixture to keep it fluid. Forty-five minutes later the volatiles were stripped from the mixture. Six hours after the beginning of the nitrile carbonate addition the reaction product, which was still reacting slightly, was removed from the kettle and pressed between "Teflon" sheets. The product was a light green, soft, rubbery material, having a melting point range of 29 to 33° C.

EXAMPLE XXXI

Catalyst: Aluminum plus calcium

To prepare the catalyst, three was added dropwise to an ethanol solution of the sodium alkoxo salt, $$NaAl(OC_2H_5)_4$$

an ethanol suspension of anhydrous calcium chloride. The reaction mixture was filtered after one-half hour and the filtrate chilled until clear. A small amount of solids, apparently sodium chloride, was deposited on the bottom of the chilled filtrate flask. The mother liquor was decanted and determined to be an ethanol solution of the calcium alkoxo salt, , at a concentration of about 9.03 mg. of Al per cc. Two and four-tenths (2.4) cc. of this catalyst solution was added to 30 g. of poly (tetramethylene ether) glycol (mol. wt. of 980; hydroxyl No. of 114) contained in a glass reaction kettle. This glycol had been degassed for one half hour at 100° C. and 4 mm. of Hg pressure with stirring. At the time of the addition of the catalyst solution the glycol was under a nitrogen atmosphere. The clear reaction mixture was again degassed at 100° C. for one hour. To the resultant mixture was added over a period of about 7 to 8 minutes, with stirring, 6.98 g. of butane-1,4-di(nitrile carbonate) and about 50 cc. of dry toluene. The last traces of the nitrile carbonate were washed into the reaction mixture using another 5 cc. of toluene. The mixture began to gel within about 15 to 20 minutes. Two hours after beginning the addition of the nitrile carbonate the toluene was stripped out under reduced pressure at about 111° C. Four and one-half (4½) hours after the beginning of the nitrile carbonate addition the reaction product was removed from the kettle and pressed between "Teflon" sheets. The product was a tough, polymeric material, having a slightly yellow color and a melting point of about 80° C. It was difficult to dissolve the product in methylethyl ketone and in tetrahydrofuran.

EXAMPLE XXXII

Catalyst: Aluminum plus sodium

To a 100 ml. resin kettle equipped with a mechanical stirrer was added 13 g. (0.00433 mol) of "Actol 31–56" (a poly(oxypropylene) triol of 3,000 molecular weight). This triol was degassed for 45 minutes at 105° C. and 15 mm. Hg pressure. The reaction kettle was then opened to a nitrogen atmosphere and 7 mg. of sodium aluminum hydride and 6 mols of absolute ethanol were added. The temperature was maintained at 105° C. After the sodium aluminum hydride had dissolved, the reaction mixture was again degassed for 30 minutes at 105° C. and 15 mm. Hg pressure to remove the ethanol. The reaction kettle was again opened to a nitrogen atmosphere and 1.3 g. of a silicon surfactant ("Y–4586") was added and mixed into the polyol. Then 1.48 g. (0.0065 mol) of butane-1,4-di(nitrile carbonate) was added. During the addition of the nitrile carbonate the mechanical stirrer was turned off. As soon as all of the nitrile carbonate had been added, the reaction mixture was stirred vigorously for one minute, then the stirring was stopped. The reaction mixture raised rapidly to a snow white foam of small, uniform cell size. The foam was removed from the reaction kettle after 15 minutes. It was quite soft and resilient. It had a density of 5 pounds per cubic foot.

EXAMPLE XXXIII

Catalyst: Aluminum plus sodium

The reaction was carried out as described in Example XXXII except that 1.3 g. of calcium carbonate was added to the polyol, prior to the addition of the nitrile carbonate, to serve as a filler. The resulting urethane foam was a snow white, resilient material having a density of 3.3 pounds per cubic foot.

EXAMPLE XXXIV

Catalyst: Aluminum plus sodium

To prepare the catalyst, a solution of sodium n-butoxide (made by dissolving 3.0 mg. (0.000066 mol.) of metallic sodium in 6 ml. of dry n-butanol) was added to 20 g. (0.02 mol.) of poly(tetramethylene ether) glycol (M.W.: 980; Hydroxyl No.: 114) contained in a 100 ml. resin kettle. This glycol had been previously degassed for one hour at 15 mm. Hg pressure at 117° C. The reaction mixture was again degassed at 128° C. to remove n-butanol; then, 30 mg. of aluminum isopropoxide was added and degassing continued for an additional two hours. Maintaining the temperature at 128° C., the evacuated reaction kettle was opened to a nitrogen atmosphere and continuously purged with nitrogen while 4.65 g. (0.02 mol.) of butane-1,4-di(nitrile carbonate) was added in seven minutes. Within eight minutes after completion of the addition of the carbonate the reaction mixture had gelled. Heating of the reaction mixture was continued for 1 hour and 45 minutes, at the end of which time the polymer was a non-sticky, rubbery mass. The polymer had a $\overline{M}_w$ of 742,000 and a $\overline{M}_n$ of 28,875 as determined by Gel Permation Chromatography. It was soluble in all organic solvents tested and its infrared spectrum in chloroform showed bands at 2.95 and 5.87 microns, which is characteristic of polyurethanes.

EXAMPLE XXXV

Catalyst: Tin plus sodium

To prepare the catalyst, a solution in dry benzene of 1 mole of dibutyltin oxide and 1 mole of dibutyltin dilaurate was refluxed and then the benzene stripped off, leaving a liquid distannoxane. This liquid was then added to a solution formed by dissolving 1 mole of sodium in t-butanol. There was formed in the reaction mixture a solid sodium alkoxo salt of the distannoxane. The solid was removed from the reaction mixture by centrifugation, washed with t-butanol and then dried.

Into a 100 ml. round bottom reaction vessel were placed 30.00 gms. (0.01965 mole) of a polyester prepared from adipic acid and 1,4-butanediol (the polyester having a NCO hydroxyl value of 1.31 meq./gm. and an acid no. of 0.48 mg. KOH/gm.) and 220 p.p.m. of water. The system was closed and degassed under 0.5 mm. Hg vacuum. Heat was applied and the outside oil bath temperature was raised to 135–140° C. and maintained for 1 hour. The reaction mixture was then allowed to cool down to 105° C. and 75 mg. of the alkoxo salt catalyst was added. The mixture was then stirred well for 30 minutes under 0.5 mm. Hg vacuum.

4.4835 gms. (0.01965 mole) of butane-1,4-di(nitrile carbonate) was dissolved in 10 ml. of dry p-dioxane and the resultant solution was added to the reaction mixture. An additional 15 ml. of dry p-dioxane was then added. After five hours of reaction time a polymeric product was removed and dried to remove solvent.

Gel permeation chromatography results on this polymer indicated that it had a $\overline{M}_w$ of approximately 280,000 and an $\overline{M}_n$ of approximately 76,000.

It is claimed:
1. In the method of preparing an organic compound having one or more urea, urethane or thiourethane groups obtained by condensing (A) a nucleophilic organic compound having at least one reactive hydrogen-containing radical selected from the group consisting of primary amino radicals, secondary amino radicals, hydroxyl radicals and mercapto radicals with (B) a cyclic nitrile carbonate having the structure:

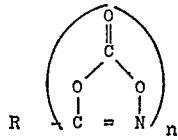

wherein R is an organic radical which consists essentially of carbon and hydrogen and is free of reactive hydrogens as determined by the Zerewitinoff test and $n$ is 1 to 4, the improvement which comprises catalyzing the condensation reaction by contacting said (A) and (B) with a catalytically-effective amount of (C) the catalyst combination of:
(I) first metal selected from the metals of Groups III through V of the Periodic Chart of the Elements, and
(II) second metal selected from the metals of Groups I, II, and the iron series of Group VIII of the Periodic Chart of the Elements,
said first and second metals being present in the catalyst combination in non-elemental forms sufficiently soluble in the reaction mixture to permit dissolution of catalytically-effective amounts of said first and second metals.

2. The improvement of claim 1 wherein said first and second metals are present in the catalyst combination in a ratio of about 0.2 to 4 molar equivalents of said first metal per molar equivalent of said second metal.

3. The improvement of claim 2 wherein $n$ is 2 to 4.

4. The improvement of claim 2 wherein said nucleophilic compound is polyhydroxyl.

5. The improvement of claim 4 wherein said first and second metals are present in the catalyst combination in the form of a bi-metallic compound having the general formula:

wherein Ma is said first metal, Mc is said second metal, and X is a component which is capable of entering into an interchange reaction with the the nucleophilic organic compound to effect salt formation and production of a linkage between the first metal and the nucleophilic organic compound, said linkage being selected from the group consisting of:

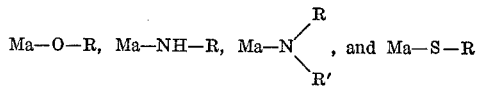

wherein R and R′ represent the residue of said nucleophilic organic compound after removal therefrom of a reactive hydrogen.

6. The improvement of claim 5 wherein X is supplied by aliphatic hydrocarbyloxy radicals of 1 to about 50 carbon atoms and the bi-metallic compound is essentially unreactive with methyl iodide and non-dissociated in ethyl alcohol.

7. The improvement of claim 6 wherein Ma is selected from the group consisting of aluminum, titanium, tin, lead and bismuth.

8. The improvement of claim 7 wherein Mc is selected from the group consisting of alkali metals, alkaline earth metals, nickel and copper.

9. The improvement of claim 8 wherein Mc is alkali metal.

10. The improvement of claim 9 wherein $n$ in the cyclic nitrile carbonate is 2, and said polyhydroxyl nucleophilic compound is selected from the group consisting of poly (alkylene ether) glycols and polyesters of a poly (alkylene ether) glycol and an alkane dioic acid.

11. A polyurethane prepared by condensation of a polyhydroxyl organic compound with a cyclic nitrile carbonate having the structure:

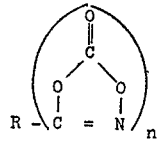

wherein R is an organic radical which consists essentially of carbon and hydrogen and is free of reactive hydrogens as determined by the Zerewitinoff test and $n$ is 2 to 4, said polyurethane having a weight average molecular weight of at least about 150,000.

12. A polyurethane according to claim 11 wherein the polyhydroxyl organic compound is dihydroxyl and $n$ in the cyclic nitrile carbonate is 2.

13. A polyurethane according to claim 12 which has a weight average molecular weight of at least about 300,000 and which is soluble in chloroform.

14. A polyurethane according to claim 11 which has a weight average molecular weight greater than 500,000.

15. A polyurethane according to claim 13 wherein the dihydroxyl organic compound is a poly(alkylene ether) glycol having a molecular weight of greater than about 750.

16. A polyurethane according to claim 15 wherein the alkylene group of the poly(alkylene ether) glycol has from 2 to 4 carbon atoms.

17. A polyurethane according to claim 16 wherein the cyclic nitrile carbonate is butane-1,4-di(nitrile carbonate).

18. A polyurethane according to claim 16 wherein the cyclic nitrile carbonate is benzene-1,4-di(nitrile carbonate).

19. A polyurethane according to claim 17 wherein the poly(alkylene ether) glycol is a poly(tetramethylene ether) glycol.

20. A polyurethane according to claim 18 wherein the poly(alkylene ether) glycol is a poly(tetramethylene ether) glycol.

21. A polyurethane according to claim 12 wherein the dihydroxyl organic compound is a polyester of a poly(alkylene ether) glycol and an alkane dioic acid.

22. A polyurethane according to claim 21 wherein the polyester is a poly(tetramethylene adipate) glycol.

23. A polyurethane according to claim 22 wherein the cyclic nitrile carbonate is butane-1,4-di(nitrile carbonate).

24. The improvement of claim 1 wherein $n$ is 2 and R has 1 to 30 carbon atoms.

25. The improvement of claim 24 wherein R is aliphatic.

26. The improvement of claim 25 wherein R has up to 12 carbon atoms.

27. The improvement of claim 1 wherein the cyclic nitrile carbonate is butane-1,4-di(nitrile carbonate).

28. The improvement of claim 8 wherein R is aliphatic.

29. The improvement of claim 28 wherein the cyclic nitrile carbonate is butane-1,4-di(nitrile carbonate).

30. The improvement of claim 9 wherein R is aliphatic.

31. The improvement of claim 30 wherein the cyclic nitrile carbonate is butane-1,4-di(nitrile carbonate).

32. The improvement of claim 10 wherein R is aliphatic.

33. The improvement of claim 32 wherein the cyclic nitrile carbonate is butane-1,4-di(nitrile carbonate).

References Cited

UNITED STATES PATENTS

| | | | |
|---|---|---|---|
| 3,480,595 | 11/1969 | Burk et al. | 260—77.5 |
| 3,531,425 | 9/1970 | Burk et al. | 260—22 |

OTHER REFERENCES

Moeller: Inorganic Chemistry, John Wiley and Sons, Inc., N.Y., 1952, pp. 122 and 661.

DONALD E. CZAJA, Primary Examiner

M. J. WELSH, Assistant Examiner

U.S. Cl. X.R.

260—18 TN, 31.8 N, 37 N, 75 WB, 75 NK, 75 R, 77.5 B, 77.5 C, 859 R, 859 PY

UNITED STATES PATENT OFFICE
CERTIFICATE OF CORRECTION

Patent No. 3,652,507          Dated March 28, 1972

Inventor(s) Emmett H. Burk, Jr., Helmuth W. Kutta, Larry G. Wolgemuth

It is certified that error appears in the above-identified patent and that said Letters Patent are hereby corrected as shown below:

Column 10, line 19, "500" should read --5000--

Signed and sealed this 18th day of July 1972.

(SEAL)
Attest:

EDWARD M. FLETCHER, JR.
Attesting Officer

ROBERT GOTTSCHALK
Commissioner of Patents